(12) United States Patent
Li et al.

(10) Patent No.: US 8,503,564 B2
(45) Date of Patent: Aug. 6, 2013

(54) METHOD AND SYSTEM FOR DATA TRANSMISSION

(75) Inventors: Bin Li, Shenzhen (CN); Yi Luo, Shenzhen (CN); Hui Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 12/692,202

(22) Filed: Jan. 22, 2010

(65) Prior Publication Data

US 2010/0232528 A1 Sep. 16, 2010

Related U.S. Application Data

(63) Continuation of application No. PCT/CN2009/070808, filed on Mar. 16, 2009.

(51) Int. Cl.
*H04B 7/02* (2006.01)
*H04L 27/00* (2006.01)

(52) U.S. Cl.
USPC ............................. 375/267; 375/295

(58) Field of Classification Search
USPC ............... 375/259, 267, 260, 295, 316, 302, 375/308
See application file for complete search history.

(56) References Cited

U.S. PATENT DOCUMENTS

| 2007/0249296 A1* | 10/2007 | Howard et al. ............... 455/101 |
| 2008/0070564 A1* | 3/2008 | Li et al. ..................... 455/424 |
| 2008/0226003 A1 | 9/2008 | Chevalier et al. |

FOREIGN PATENT DOCUMENTS

| EP | 0769873 A1 | 4/1997 |
| JP | 2008532356 A | 8/2008 |
| WO | WO 0193439 A1 | 12/2001 |
| WO | WO 2009012446 A2 | 1/2009 |
| WO | WO 2009023700 A2 | 2/2009 |

OTHER PUBLICATIONS

Extended European Search Report in corresponding European Patent Application No. 09798999.0 (Jul. 19, 2012).
2nd Office Action in corresponding Japanese Patent Application No. 2011-504300 (Aug. 21, 2012).
1st Office Action in corresponding Chinese Patent Application No. 200980100823.9 (May 7, 2013).

* cited by examiner

*Primary Examiner* — Kevin M Burd
(74) *Attorney, Agent, or Firm* — Leydig, Voit & Mayer, Ltd.

(57) ABSTRACT

A data transmission method, a communications system and related apparatuses are disclosed. The data transmission method includes the following steps: a transmitter obtains channel information corresponding to channels between the transmitter and several receivers; the transmitter obtains a control vector corresponding to a receiver according to the channel information; the transmitter modulates data to be transmitted by means of one-dimensional modulation to obtain modulated symbols; the transmitter processes the modulated symbols and the control vector to obtain transmitted data of each antenna; the transmitter transmits the transmitted data to the receiver; the receiver receives the transmitted data in a predetermined spatial direction of received symbol. The present invention also discloses a communications system and related apparatuses.

17 Claims, 7 Drawing Sheets

METHOD AND SYSTEM FOR DATA TRANSMISSION

CROSS-REFERENCE TO RELATED APPLICATIONS

This application is a continuation of International Patent Application No. PCT/CN2009/070808, filed Mar. 16, 2009, which is hereby incorporated by reference in its entirety.

TECHNICAL FIELD

The present invention relates to communications, and in particular, to a method and a system for data transmission.

BACKGROUND

In a radio communications system, channel capacity grows with the number of antennas. To obtain larger system capacity than that of a single-antenna system, a multi-input-multi-output (MIMO) transmission system has multiple antennas placed respectively at a transmitter and a receiver so as to increase spectrum efficiency of radio links and improve reliability of the links Channels of a MIMO system are called MIMO channels. For more efficient use of the MIMO channels, researchers propose various methods to obtain MIMO channel capacity, such as space time coding, and precoding.

Space multiplexing and diversity are often adopted in MIMO techniques. MIMO space multiplexing implements precoding by fully using channel state information so as to improve system performance. MIMO precoding preprocesses a transmitted signal by using channel state information at the transmitter. Such techniques are closed loop MIMO techniques, including space time coding with precoding, multiplexing, and joint transmit and receive technology. The MIMO broadcast downlink scenario commonly seen in practice is especially widely studied.

In the MIMO broadcast downlink scenario, Dirty Paper Coding is an optimized solution which can obtain the maximum sum of capacity. However, Dirty Paper Coding is yet only a result of information theory. The optimal Dirty Paper Coding is still an outstanding issue with no practical system application. Therefore, most research concentrates on precoding that is easier to implement.

Multi-user precoding can be realized in different methods and can be categorized to linear precoding and nonlinear precoding.

Linear precoding includes interference elimination, such as zero-forcing and block diagonalization. The interference cancellation method further includes zero-forcing and block diagonalization. Zero-forcing means precoding is adopted at the transmitter so as to eliminate interference of other non-expected signals at every receiver.

In addition to multi-user precoding, Gaussian channel capacity in a radio communications system is also a hot topic of research. Gaussian interference channel capacity is an issue not yet effectively solved. Gaussian interference channel means Signals of different users interfere with each other, data cannot be shared among users and joint transmission of data is impossible even if every user knows the complete channel information.

Because the mutual interference cannot be eliminated from the interference channel, there are two traditional solutions: one is to process interference as noises where interference is weak; the other is orthogonalization which, however, offers small capacity, only $1/K \log(SNR) + o(\log(SNR))$.

In recent years, the Gaussian interference channel has been studied continuously and it is found that the single-user capacity border of a symmetrical Gaussian interference channel is $\frac{1}{2} \log(SNR) + o(\log(SNR))$. It is also found that the capacity limit can be approached by interference alignment.

Interference alignment separates the useful signal from the interference signal in terms of space at a receiver by means of preprocessing at a transmitter when the complete channel information is known, while interference of different transmitters on the receiver is aligned into one spatial dimension, thus avoiding the impact of the interference and increasing capacity.

Nevertheless, in the conventional art, after the transmitter preprocesses a signal, the transmitted signal is distributed in the real part and the imaginary part and then sent to the receiver. The useful part in the receiver may be distributed in the real part and imaginary part of the receive signal, or the entire space of the received signal. To suppress interference, it is necessary to align the interference of both the real part and imaginary part with zero so that the space of the control vector of the useful signal is constrained and that the Signal to Noise Ratio (SNR) is hard to improve. Therefore, system performance is limited in the conventional art.

SUMMARY

Embodiments of the present invention provide a method and a system for data transmission so as to increase the number of users and improve system performance.

A method for data transmission includes: (1) obtaining, by a transmitter, channel information corresponding to channels between the transmitter and several receivers; (2) obtaining, by the transmitter, one or more control vectors corresponding to one or more receivers according to the channel information; (3) modulating, by the transmitter, data to be transmitted by means of one-dimensional modulation to obtain modulated symbols; (4) processing, by the transmitter, the modulated symbols and the one or more control vectors to obtain transmitted data of each antenna; (5) transmitting, by the transmitter, the transmitted data to the one or more receivers; and (6) receiving, by the one or more receivers, the transmitted data in a predetermined spatial direction of received symbol. A communications system includes: (1) a transmitter, adapted to: obtain channel information corresponding to channels between the transmitter and several receivers, obtain a one or more control vectors corresponding to one or more receivers according to the channel information, modulate data to be transmitted by means of one-dimensional modulation to obtain modulated symbols, process the modulated symbols and the one or more control vectors to obtain transmitted data of each antenna and transmit the transmitted signal to the one or more receivers; and (2) the receiver, adapted to receive the transmitted data in a predetermined spatial direction of received symbol.

A data transmitting apparatus includes: (1) a channel information obtaining unit, adapted to obtain channel information corresponding to between the data transmitting apparatus and receivers; (2) a control vector obtaining unit, adapted to obtain one or more control vectors corresponding to one or more receivers according to the channel information; (3) a data processing unit, adapted to: modulate data to be transmitted by means of one-dimensional modulation to obtain modulated symbols and process the modulated symbols and the control vector to obtain transmitted data of each antenna; and (4) a data transmitting unit, adapted to transmit the data to the one or more receiver.

A data receiving apparatus includes: (1) an obtaining unit, adapted to obtain channel information between a transmitter and the data receiving apparatus; (2) a channel information feedback unit, adapted to feed back the channel information to the transmitter; and (3) a data receiving unit, adapted to receive transmitted data from the transmitter in a predetermined spatial direction of received symbol.

In the embodiments, after the transmitter transmits the data, the receiver receives the data in a predetermined spatial direction of received symbol. The transmitter obtains modulated symbols by means of one-dimensional modulation on the transmitted data so that the modulated symbol only occupies the real part or imaginary part. The receiver does not need to align the interference of both the real part and the imaginary part with zero so as to increase the choice space of useful signals. Therefore, system performance may be improved and the transmission system may be able to support more users.

DETAILED DESCRIPTION

Embodiments of the present invention provide a method and a system for data transmission to increase the number of users and improve system performance.

The data transmission method in an embodiment of the present invention includes the following:

1. A transmitter obtains channel information corresponding to channels between the transmitter and several receivers.

In this embodiment, before the transmitter transmits data, the transmitter obtains channel information corresponding to channels between the transmitter and several receivers. In particular, the transmitter receives channel information fed back by the receivers or the transmitter detects channel information. Specific modes will be described in subsequent embodiments.

2. The transmitter obtains one or more control vectors corresponding to one or more receivers according to the channel information.

After the transmitter obtains the channel information corresponding to channels between the transmitter and the several receivers, the transmitter may obtain one or more control vectors corresponding to one or more receivers according to the channel information.

3. The transmitter modulates data to be transmitted in one-dimensional modulation mode to obtain modulated symbols.

4. The transmitter processes the modulated symbols and the one or more control vectors to obtain the transmitted signal of each antenna.

In this embodiment, the processing of the modulated symbols and the one or more control vectors may include: multiplying the modulated symbols by the control vectors. It is understandable that, in practice, operations other than multiplication may be adopted. The specific operation is not limited here.

5. The transmitter transmits the transmitted data to the one or more receivers.

6. The receiver receives the transmitted data in a predetermined spatial direction of received symbol.

In this embodiment, after the transmitter transmits the data, the one or more receivers receive the transmitted data in a predetermined spatial direction of received symbol. The transmitter obtains modulated symbols by means of one-dimensional modulation on data to be transmitted so that the modulated symbol is only distributed in the real part or imaginary part. The one or more receivers do not need to align the interference of both the real part and the imaginary part with zero so as to increase the choice space of useful signals. Therefore, system performance may be improved and the transmission system may be able to support more users.

For easy understanding, a centralized solution and a distributed solution of the data transmission method in the above embodiment of the present invention will be described respectively.

Figure 1:
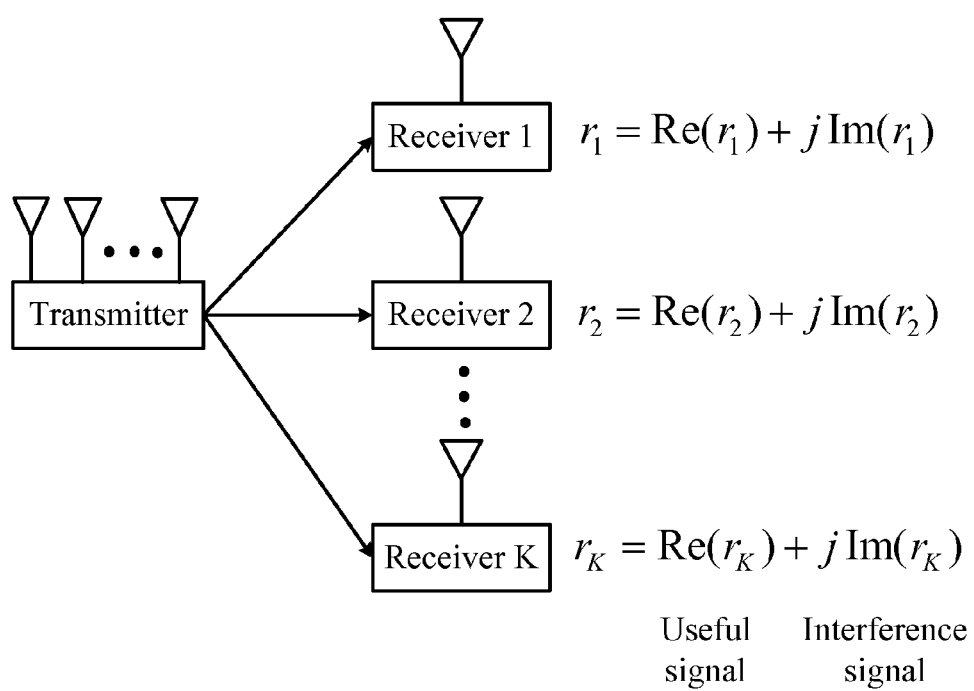
FIG. 1 shows a scenario of a data transmission method in an embodiment of the present invention.

As shown in FIG. 1, a scenario of the data transmission method in this embodiment is a beamforming system based on K users, namely a centralized data transmission system.

In the centralized data transmission system, the base station has $N_T$ receiving antennas and the beamforming system of K users, and uses different control vectors to send K data streams to K users simultaneously. To avoid interference between data streams sent to the K users, in this embodiment, the useful signal is aligned with the real part or imaginary part of received signals and the interference is aligned with the imaginary part or real part of the received signals. After receiving the received signal, the receiver discards the imaginary part or the real part directly, thus eliminating the interference carried in the imaginary part or the real part.

It should be noted that if the useful signal is aligned with the real part, the interference is aligned with the imaginary part; if the useful signal is aligned with the imaginary part, the interference is aligned with the real part.

Similarly, if the receiver receives the useful signal in the real part, the interference in the imaginary part is discarded directly; if the receiver receives the useful signal in the imaginary part, the interference in the imaginary part is discarded directly.

In the following embodiments, the transmitted signal is modulated to the real part and the interference with other users is aligned with the imaginary part; the receiver discards the imaginary part directly after receiving the receive signal, thus eliminating the interference carried in the imaginary part. It is understandable that, in practice, the transmitter may also modulate the transmitted signal to the imaginary part and align the interference with the real part, and the receiver receives the useful signal from the imaginary part and discard the interference in the real part directly. The procedures are alike and not limited here.

Suppose the state information of the channel between the $N_T$ antennas and the $m^{th}$ user is $H_m=[h_{m1}\ h_{m2}\ \ldots\ h_{mN_T}]$, $1 \leq m \leq K$, where $h_{m1}\ h_{m2}\ \ldots\ h_{mN_T}$ are independent complex Gaussian variables with zero means and unit variances. The control vector of the $i^{th}$ user is $v_i=[v_{i1}\ v_{i2}\ \ldots\ v_{iN_T}]^T$, where $x^T$ is the transpose of x. For example, $[v_{i1}\ v_{i2}\ \ldots\ v_{iN_T}]^T$ is the transpose of $[v_{i1}\ v_{i2}\ \ldots\ v_{iN_T}]$.

The receive signal of the $m^{th}$ user may be expressed as:

$$r_m = H_m v_m s_m + \sum_{l=1, l\neq m}^{K} H_l v_l s_l + n_m$$

where, $s_l$ is the transmitted signal of the $i^{th}$ data stream. Suppose that $s_l$ is an independent and identically distributed variable with zero mean and unit variance and that $n_m$ is a complex additive Gaussian noise with zero mean and the variance of $2\sigma_n^2$.

Then, the receive signals of the K receivers may be combined as:

$$R = \begin{bmatrix} H_1 \\ H_2 \\ \vdots \\ H_K \end{bmatrix} VS + N$$

where, $R=[r_1\ r_2\ \ldots\ r_K]^T$, $S=[s_1\ s_2\ \ldots\ S_K]^T$, $N=[n_1\ n_2\ \ldots\ n_K]^T$; R means the receive signal vector of a receiver; S means the transmitted signal vector of the transmitter; N means a noise; and $H_K$ means the channel coefficient vector between the transmitter and an receiver.

Each receiver detects only the real part, which may be expressed as:

$$\text{Re}(r_m) = \text{Re}[H_m v_m s_m] + \text{Re}\left[\sum_{l=1,l\neq m}^{K} H_l v_l s_l\right] + \text{Re}(n_m)$$

The first item stands for the useful signal; the second item stands for the interference from other data streams; and the last item stands for the noise part.

The detection at receivers may be expressed as:

$$\text{Re}(R) = H_{sup} V_\Sigma S + \text{Re}(N) \text{ where,}$$

$$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix} \text{ and } H_{l\Sigma} = [\text{ Re}(H_l)\ \text{ Im}(H_l)\ ].$$

The SINR detected by the receiver is:

$$SINR_m = \frac{|\text{Re}[H_m v_m s_m]|^2}{\left|\text{Re}\left[\sum_{l=1,l\neq m}^{K} H_l v_l s_l\right]\right|^2 + \sigma_n^2} = \frac{|\text{Re}(H_m)\text{Re}(v_m) - \text{Im}(H_m)\text{Im}(v_m)|^2}{\sum_{l=1,l\neq m}^{K}|\text{Re}(H_l)\text{Re}(v_l) - \text{Im}(H_l)\text{Im}(v_l)|^2 + \sigma_n^2}$$

where, $H_{x\Sigma}$ expresses a matrix made up of the real part of $H_x$ and the imaginary part of $H_x$, which means $$H_{l\Sigma} = [\text{ Re}(H_l)\ \text{ Im}(H_l)\ ] \text{ and } v_{l\Sigma} = \begin{bmatrix} \text{Re}(v_l) \\ -\text{Im}(v_l) \end{bmatrix}.$$

The above equation may be described as:

$$SINR_m = \frac{|H_{m\Sigma} v_{m\Sigma}|^2}{\sum_{l=1,l\neq m}^{K} |H_{l\Sigma} v_{l\Sigma}|^2 + \sigma_n^2}$$

Considering the Signal-to-Leakage Ratio (SLR) algorithm principle, the transmit control vector of each stream is obtained by means of optimized SLR. The following optimized equation is obtained:

$$SLR_m = \frac{|H_{m\Sigma} v_{m\Sigma}|^2}{\sum_{l=1,l\neq m}^{K} |H_{l\Sigma} v_{m\Sigma}|^2} = \frac{v_{m\Sigma}^H H_{m\Sigma}^H H_{m\Sigma} v_{m\Sigma}}{v_{m\Sigma}^H \left\{\sum_{l=1,l\neq m}^{K} H_{l\Sigma}^H H_{l\Sigma}\right\} v_{m\Sigma}}$$

$x^H$ is the conjugate transpose of x. For example, $H_{m\Sigma}^H$ is the conjugate transpose of $H_{m\Sigma}$, and $v_{m\Sigma}^H$ is the conjugate transpose of $v_{m\Sigma}$ and $H_{l\Sigma}^H$ is the conjugate transpose of $H_{l\Sigma}$.

The specific processing at the transmitter is as follows:

1. The transmitter obtains channel information corresponding to channels between the transmitter and several receivers, including data channel information matrix $H_{m\Sigma}^H$-$H_{m\Sigma}$ and interference channel information matrix $$\sum_{l=1,l\neq m}^{K} H_{l\Sigma}^H H_{l\Sigma}.$$

2. The transmitter performs Singular Value Decomposition (SVD) on $$\sum_{l=1,l\neq m}^{K} H_{l\Sigma}^H H_{l\Sigma}$$

to obtain U and Q in $$\sum_{l=1,l\neq m}^{K} H_{l\Sigma}^H H_{l\Sigma} = UQU^H.$$

In this embodiment, performing SVD on a matrix obtains three matrixes: a first matrix U, a second matrix Q, and a third matrix $U^H$, where the third matrix $U^H$ is the conjugate transpose of the first matrix U.

3. The transmitter uses U and Q to obtain an eigenvector $v_0$ corresponding to the maximum eigenvalue $\lambda_0$ of $[H_{m\Sigma}(\sqrt{Q}U^H)^{-1}]^H H_{m\Sigma}(\sqrt{Q}U^H)^{-1}$.

4. The transmitter obtains $v_{m\Sigma}$ that maximizes the SLR, namely, $v_{m\Sigma}=(\sqrt{Q}U^H)^{-1} v_0$.

5. The transmitter modulates the data to be transmitted by means of one-dimensional modulation to obtain modulated symbols and processes the modulated symbols and the control vector to obtain the transmitted signal of each antenna.

In this embodiment, the processing of the modulated symbols and the control vector may include: multiplying the modulated symbols by the corresponding control vector. It is understandable that, in practice, operations other than multiplication may be adopted. The specific operation is not limited here.

6. The transmitter transmits the transmitted data to the receivers.

7. The receiver receives the transmitted data in a predetermined spatial direction of received signal.

Figure 2:
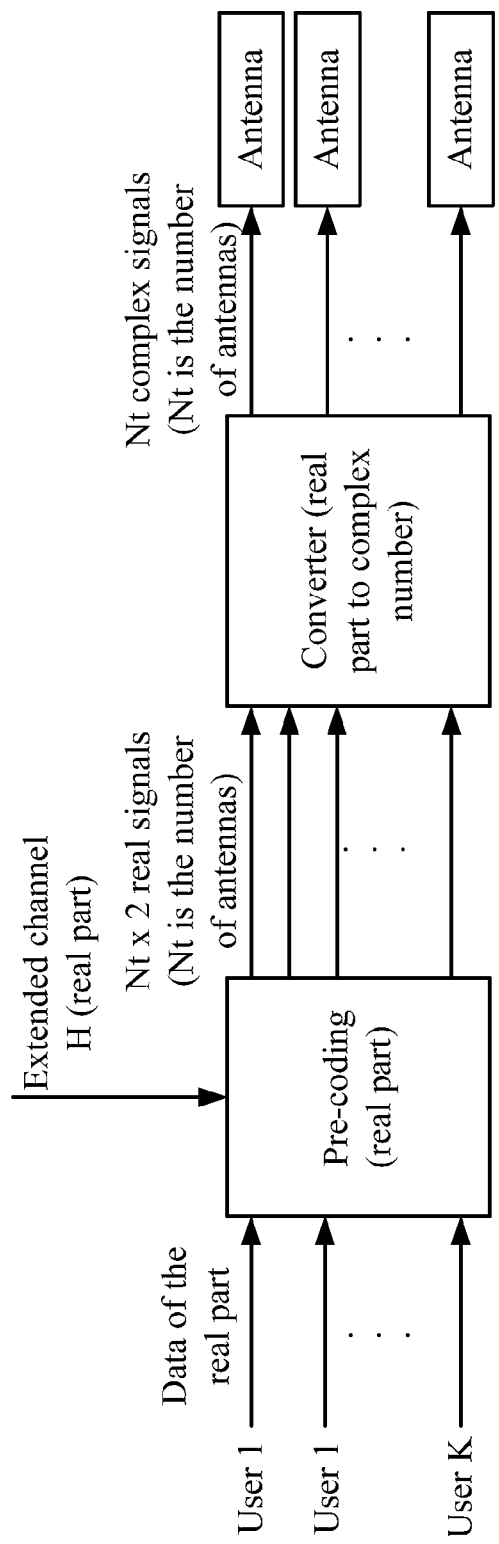
FIG. 2 shows a structure of a transmitter in an embodiment of the present invention.

It should be noted that a centralized data transmission solution is adopted in this embodiment, which means there are only one transmitter and multiple receivers. The specific transmitter structure is shown in FIG. 2, where the transmitter precodes only the real part of data. Specific precoding schemes include linear precoding like zero-forcing, Minimum Mean Square Error (MMSE) and other nonlinear precoding schemes. Therefore, the transmitter aligns the useful signal with the real part of the receiver. In this embodiment, the receiver receives the transmitted data in a predetermined spatial direction of received signal and after receiving the transmitted data, discards the imaginary part directly so that the interference carried in the imaginary part is eliminated.

In the centralized data transmission solution in the above embodiment, a control vector is obtained by maximizing the SLR. In practice, the control vector may be obtained by other means, for example, by selecting the control vector through a zero-forcing algorithm, the specific process of which is as follows:

In the centralized data transmission solution, the receive signal in the entire system may be described in the following matrix:

$$R = \begin{bmatrix} H_1 \\ H_2 \\ \vdots \\ H_K \end{bmatrix} VS + N$$

where, $R=[r_1 \, r_2 \ldots r_K]^T$, $S=[s_1 \, s_2 \ldots s_K]^T$, $N=[n_1 \, n_2 \ldots n_K]^T$; R means the receive signal vector of a receiver; S means the transmitted signal vector of the transmitter; N means a noise; and $H_K$ means the channel coefficient vector between the transmitter and an receiver.

$$Re(R) = H_{sup} V_\Sigma S + Re(N) \text{ where,}$$

$$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix} \text{ and } H_{l\Sigma} = [\, Re(H_l) \quad Im(H_l) \,].$$

The specific data transmission process includes the following:

1. The transmitter obtains channel information corresponding to channels between the transmitter and several receivers, namely, extended channel information matrix $H_{sup}$.

2. The transmitter calculates the control vector matrix with a zero-forcing algorithm, particularly $Re(R)=H_{sup}V_\Sigma S+Re(N)$, which means, to best eliminate the interference of other modulated symbols, a possible way is to make $Re(R)$ closest to $S+Re(N)$, namely make the receive signal a combination of the transmitted signal and noise. Therefore, when the control vector matrix is $V_\Sigma=H_{sup}{}^H(H_{sup}H_{sup}{}^H)^{-1}$, $Re(R)=H_{sup}V_\Sigma S+Re(N)=S+Re(N)$, each column of $V_\Sigma$ is the control vector of the corresponding receiver.

3. The transmitter searches for the corresponding control vector $v_{m\Sigma}$ in the control vector matrix according to information of the receiver.

4. The transmitter modulates the transmitted data by means of one-dimensional modulation to obtain modulated symbols and uses the modulated symbols and the control vector to obtain the transmitted signal of each antenna, and then transmits the signal to the receiver.

In this embodiment, the processing of the modulated symbols and the control vector may include: multiplying the modulated symbols by the corresponding control vector. It is understandable that, in practice, operations other than multiplication may be adopted. The specific operation is not limited here.

5. The receiver detects the real part of the received signal directly, namely receives the transmitted data in a predetermined spatial direction of received symbol.

It should be noted that, in the process of calculating the control vector matrix, $V_\Sigma=H_{sup}{}^H(H_{sup}H_{sup}{}^H)^{-1}$; in practice, however, for effective control of noises, the control vector matrix may be calculated according to the MMSE scheme, which means adding a parameter based on the zero-forcing algorithm so that $V_\Sigma=H_{sup}{}^H(H_{sup}H_{sup}{}^H+\sigma_n^2 I_n)^{-1}$, where $\sigma_n^2$ is the variance of noises and $I_n$ is a unit matrix. By doing so, the impact of noises on valid data may be effectively reduced.

Figure 3:
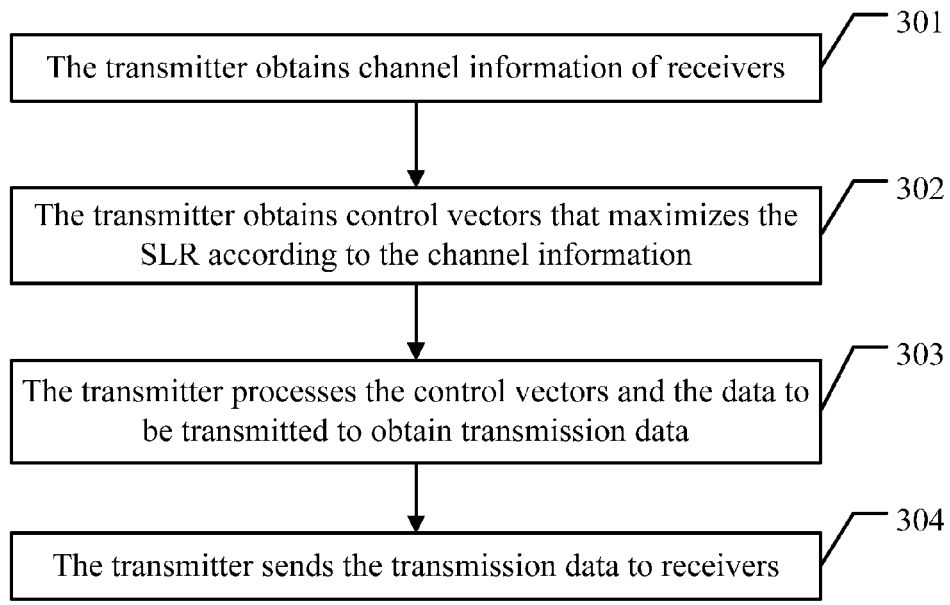
FIG. 3 shows a data transmission method in an embodiment of the present invention.

The above describes the centralized data transmission solution in this embodiment. A distributed data transmission solution in the embodiment will be described hereafter. As shown in FIG. 3, the distributed data transmission solution includes the following:

301. The transmitter obtains channel information of receivers.

This embodiment is specific to the distributed solution where there are multiple transmitters and multiple receivers. Suppose: there are K transmitters, and the number of antennas of each transmitter is $N_T$; and there are K receivers, each is corresponding to a transmitter, and each transmitter transmits a data stream to the corresponding receiver. In particular, the $m^{th}$ transmitter sends a data stream $S_m$ to the $m^{th}$ receiver. To the $m^{th}$ receiver, the data stream $S_m$ is a useful signal while to the other K−1 receivers, the data stream is an interference signal. In this embodiment, the $m^{th}$ transmitter obtains information of the data channel between the $m^{th}$ transmitter and the $m^{th}$ receiver (information of the channel that transmits useful data) and information of the interference channels between the $m^{th}$ transmitter and the other K−1 receivers.

The channel information may be obtained in the following modes:

A. Frequency Division Duplex (FDD) mode:

The receivers may obtain channel information corresponding to channels between the transmitter and the several receivers via pilot channel information and the receivers send the obtained channel information to the transmitter. The $m^{th}$ receiver sends data channel information to the transmitter while the other receivers send interference channel information to the transmitter.

Alternatively, the receivers may obtain channel information corresponding to channels between the transmitter and the several receivers via blind estimation and the receivers send the obtained channel information to the transmitter. The $m^{th}$ receiver sends data channel information to the transmitter while the other receivers send interference channel information to the transmitter.

The method for the receivers to obtain channel information is already available in the conventional art and is not limited here.

A. Time Division Duplex (TDD) mode:

If the current transmission channels are symmetric, which means they have the same transmitting resource and the same frequency, the transmitter may detect channel information corresponding to channels between the transmitter and the several receivers.

302. The transmitter obtains a control vector that maximizes the SLR according to the channel information.

In this embodiment, after the transmitter obtains channel information of the receivers, the transmitter can calculate the control vector that maximizes the SLR according to the channel information.

For easy understanding, the process of deducing the SLR in this embodiment is described in brief.

The channel coefficient vector of the $N_T$ transmitting antennas between the $l^{th}$ transmitter and the $m^{th}$ receiver is $H_{lm}=[h_{lm1}\ h_{lm2}\ \ldots\ h_{lmN_T}]$, $1 \leq l,m\ N$, where $h_{lmk}$ are independent complex Gaussian variables with zero means and the variances is 1. The control vector is $v_l=[v_{l1}\ v_{l2}\ \ldots\ v_{lN_T}]^T$, where $x^T$ is the transpose of x.

The receive signal of the $m^{th}$ receiver may be expressed as:

$$r_m = H_{mm}v_m s_m + \sum_{l=1, l\neq m}^{K} H_{lm}v_l s_l + n_m$$

$n_m$ is a complex additive Gaussian noise with zero mean and the variance is $2\sigma_n^2$. Because the receiver detects only the real part, the detected signal without the imaginary part is:

$$\text{Re}(r_m) = \text{Re}[H_{mm}v_m s_m] + \text{Re}\left[\sum_{l=1, l\neq m}^{K} H_{lm}v_l s_l\right] + \text{Re}(n_m)$$

where, the first item is the useful signal; the second item is the interference of the other transmitters; and the last item is the noise part. The SINR at the receiver is:

$$SINR_m = \frac{|\text{Re}[H_{mm}v_m s_m]|^2}{\sum_{l=1, l\neq m}^{K} |\text{Re}[H_{lm}v_l s_l]|^2 + \sigma_n^2} =$$

$$\frac{|\text{Re}(H_{mm})\text{Re}(v_m) - \text{Im}(H_{mm})\text{Im}(v_m)|^2}{\sum_{l=1, l\neq m}^{K} |\text{Re}(H_{lm})\text{Re}(v_l) - \text{Im}(H_{lm})\text{Im}(v_l)|^2 + \sigma_n^2}$$

Let $$H_{lm\Sigma} = [\text{Re}(H_{lm})\ \text{Im}(H_{lm})] \text{ and } v_{l\Sigma} = \begin{bmatrix} \text{Re}(v_l) \\ -\text{Im}(v_l) \end{bmatrix},$$

and the SINR may be expressed as:

$$SINR_m = \frac{|H_{mm\Sigma}v_{m\Sigma}|^2}{\sum_{l=1, l\neq m}^{K} |H_{lm\Sigma}v_{l\Sigma}|^2 + \sigma_n^2}$$

The above equation shows that it is necessary to know complete channel information to obtain the maximum SINR and that the solution is complicated. To simplify the solution, the question of maximizing the SINR may be changed to a question of maximizing the SLR, which means a change from optimizing the ratio of the useful signal power of a receiver to the sum of interference power and noise power of the receiver to optimizing the ratio of the useful signal power from a transmitter to the receiver to the sum of interference from the transmitter to other users. In this embodiment, the SLR may be expressed as:

$$SLR_m = \frac{|H_{mm\Sigma}v_{m\Sigma}|^2}{\sum_{l=1, l\neq m}^{K} |H_{lm\Sigma}v_{m\Sigma}|^2} = \frac{v_{m\Sigma}^H H_{mm\Sigma}^H H_{mm\Sigma} v_{m\Sigma}}{v_{m\Sigma}^H \left\{\sum_{l=1, l\neq m}^{K} H_{lm\Sigma}^H H_{lm\Sigma}\right\} v_{m\Sigma}}$$

where, $x^H$ is the conjugate transpose of x.

Perform SVD on $$\sum_{\substack{l=1 \\ l\neq m}}^{K} H_{ml\Sigma}^H H_{ml\Sigma} \text{ and } \sum_{\substack{l=1 \\ l\neq m}}^{K} H_{ml\Sigma}^H H_{ml\Sigma} = UQU^H$$

may be obtained, where $v_0$ is the eigenvector corresponding to the maximum eigenvalue $\lambda_0$ of $[H_{mm\Sigma}(\sqrt{Q}U^{-1})]^H H_{mm\Sigma}(\sqrt{Q}U^{-1})$. Therefore, $v_{m\Sigma}$ that maximizes the SLR is $v_{m\Sigma} = (\sqrt{Q}U^H)^{-1}v_0$.

In this embodiment, performing SVD on a matrix may obtain three matrixes: a first matrix U, a second matrix Q, and a third matrix $U^H$, where the third matrix is the conjugate transpose of the first matrix.

The above deduction shows, after obtaining the data channel information matrix $H_{mm\Sigma}^H H_{mm\Sigma}$ and the interference channel information matrix $$\sum_{\substack{l=1 \\ l\neq m}}^{K} H_{ml\Sigma}^H H_{ml\Sigma},$$

the transmitter can perform SVD on the interference channel information and calculate the eigenvector $v_0$ that is corresponding to the maximum eigenvalue of $[H_{mm\Sigma}(\sqrt{Q}U^{-1})]^H H_{mm\Sigma}(\sqrt{Q}U^{-1})$. The calculation may be implemented by software.

For example, the transmitter uses the software to first calculate eigenvalues of $[H_{mm\Sigma}(\sqrt{Q}U^{-1})]^H H_{mm\Sigma}(\sqrt{Q}U^{-1})$ and the eigenvector corresponding to each eigenvalue, then chooses the eigenvalue of the maximum numerical value as the maximum eigenvalue, and searches for the eigenvector that is corresponding to the maximum eigenvalue.

Afterwards, the transmitter calculates the control vector corresponding to the receiver according to the eigenvector: $v_{m\Sigma}=(\sqrt{Q}U^H)^{-1}v_0$.

303. The transmitter processes the control vector and the data to be transmitted to obtain transmitted signal.

After obtaining the control vector, the transmitter may modulate the data to be transmitted by means of one-dimensional modulation to obtain modulated symbols and multiply the modulated symbols by the control vector to obtain the transmitted signal of each antenna.

It is understandable that, in practice, the transmitter may perform other operations on the control vector and the data to be transmitted to obtain the transmitted signal. The specific operation is not limited here.

304. The transmitter sends the transmitted data to the receiver.

After obtaining the transmitted signal, the transmitter may send the transmitted data to the receiver. It should be noted that, in this embodiment, to align interference in one spatial direction, each transmitter sends a real signal and the receiver receives the transmitted data in a predetermined spatial direction of received symbol.

In this embodiment, because of the adoption of interference alignment, interference of the receiver is aligned in the imaginary part of the signal space and the useful signal is located in the real part of the transmitted data so as to avoid the impact of interference signals on the useful signal.

Also, after the transmitter sends the transmitted data, the receiver receives the transmitted data in a predetermined spatial direction of received symbol. The transmitter obtains modulated symbols by means of one-dimensional modulation on the data to be transmitted so that the modulated symbol only occupies in the real part or imaginary part. The receiver does not need to align the interference of both the real part and the imaginary part with zero so as to increase the choice space of useful signals. Therefore, system performance may be improved and the transmission system may be able to support more users.

Furthermore, in this embodiment, the control vector that maximizes the SLR is chosen and the data to be transmitted is processed according to the control vector. The SLR is the ratio of signal power from a transmitter to a receiver to interference power from the transmitter to other receivers. By maximizing the SLR, channel capacity is also increased. From the concept of SLR, it is known that in this embodiment, to realize the increase of channel capacity, the transmitter only needs to obtain channel information fed back from the receivers. The amount of channel information feedback that the transmitter need obtain is smaller and the efficiency of data transmission is therefore higher.

Figure 4:
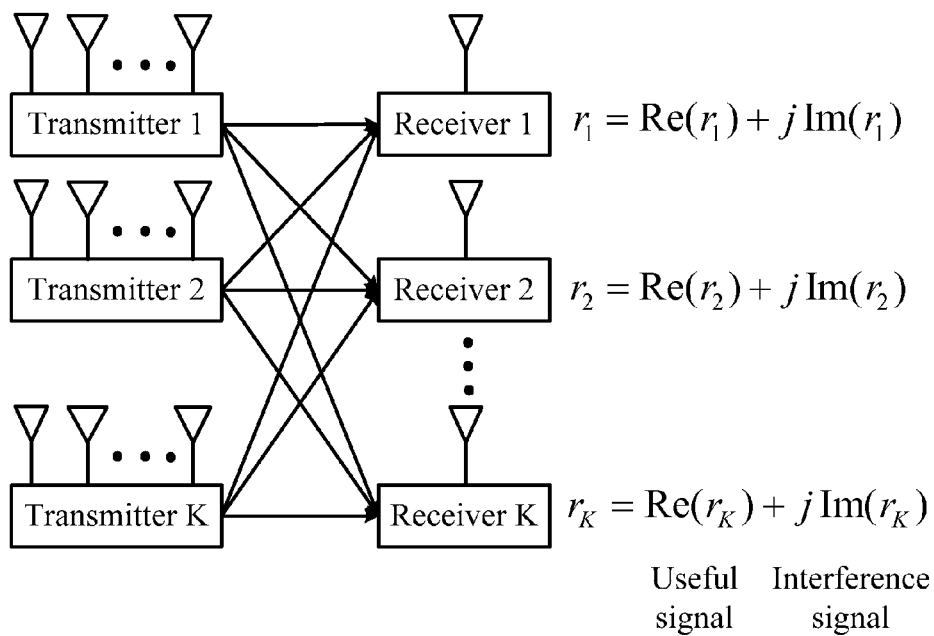
FIG. 4 shows another scenario of a data transmission method in an embodiment of the present invention.

In a distributed data transmission solution shown in FIG. 4, there are K transmitters and K receivers; each transmitter has $N_T$ antennas and each receiver has one antenna; each transmitter is corresponding to a receiver and each transmitter sends a data stream to the corresponding receiver, which means the $m^{th}$ transmitter sends a data stream to the $m^{th}$ receiver; the power is P.

The process of deducing the SLR in this embodiment is the same as the process in the embodiment shown in FIG. 3 and is therefore omitted here. The data transmission method in this embodiment includes the following:

1. Each transmitter obtains channel information corresponding to channels between the transmitter and several receivers, namely data channel information matrix $H_{mm\Sigma}{}^H$ $H_{mm\Sigma}$ and interference channel information matrix $H_{ml\Sigma}{}^H$ $H_{ml\Sigma}$.

2. The transmitter performs SVD on $$\sum_{\substack{l=1\\l\neq m}}^{K} H_{ml\Sigma}^H H_{ml\Sigma}$$

to obtain U and Q in $$\sum_{\substack{l=1\\l\neq m}}^{K} H_{ml\Sigma}^H H_{ml\Sigma} = UQU^H.$$

In this embodiment, performing SVD on a matrix obtains three matrixes: a first matrix U, a second matrix Q, and a third matrix $U^H$, where the third matrix is the conjugate transpose of the first matrix.

3. The transmitter uses U and Q to obtain the eigenvector $v_0$ corresponding to the maximum eigenvalue $\lambda_0$ of $[H_{mm\Sigma}(\sqrt{Q}U^{-1})]^H H_{mm\Sigma}(\sqrt{Q}U^{-1})$.

4. The transmitter obtains $v_{m\Sigma}$ that maximizes the SLR: $v_{m\Sigma}=(\sqrt{Q}U^H)^{-1}v_0$.

5. The transmitter modulates data to be transmitted by means of one-dimensional modulation to obtain modulated symbols.

6. The transmitter processes the modulated symbols and the control vector to obtain the transmitted signal of every antenna and sends the transmitted data to the receiver.

In this embodiment, the processing of the modulated symbols and the control vector may include: multiplying the modulated symbols by the control vector. It is understandable that, in practice, operations other than multiplication may be adopted. The specific operation is not limited here.

7. The receiver detects the real part of the received signal directly, namely receives the transmitted data in a predetermined spatial direction of received symbol.

In this embodiment, the control vector that maximizes the SLR is chosen and the data to be transmitted is processed according to the control vector. The SLR is the ratio of signal power from a transmitter to a receiver to interference power from the transmitter to other receivers. By maximizing the SLR, channel capacity is also increased. From the concept of SLR, it is known that in this embodiment, to realize the increase of channel capacity, the transmitter only needs to obtain channel information fed back from the receivers. The amount of data that the transmitter need obtain is smaller and the efficiency of data transmission is therefore higher.

Figure 5:
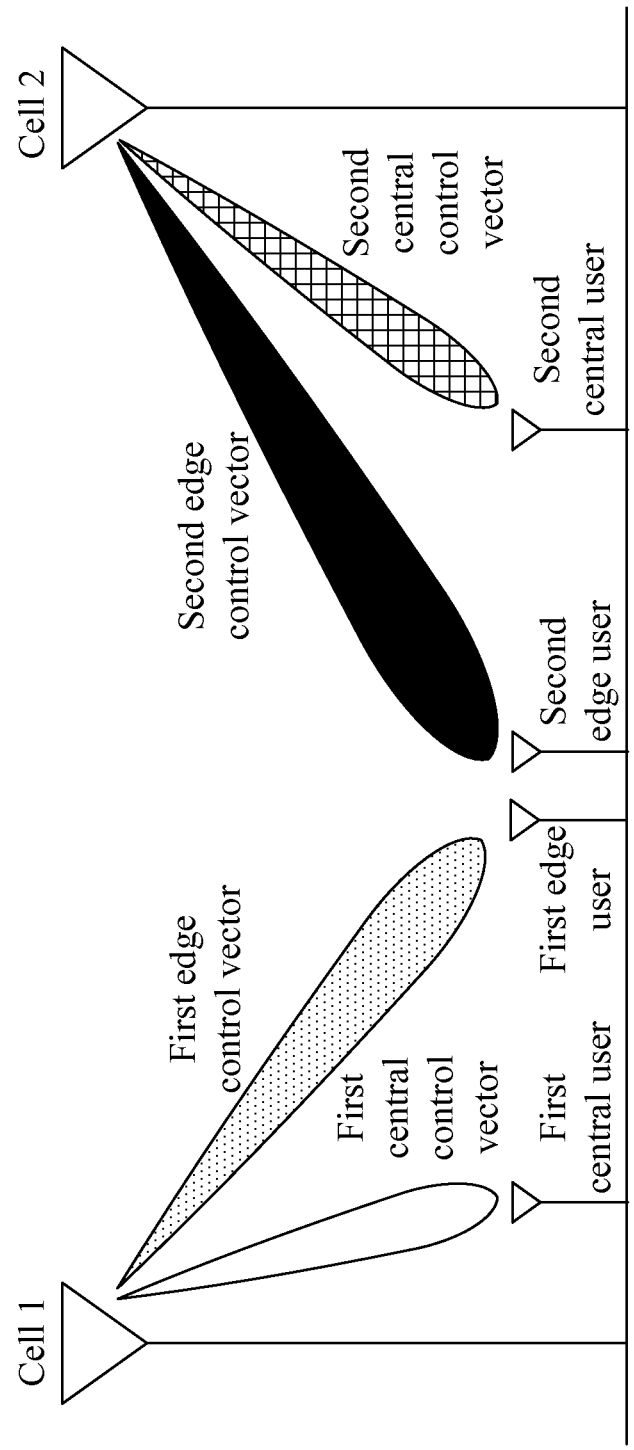
FIG. 5 shows still another scenario of a data transmission method in an embodiment of the present invention.

The data transmission solution in this embodiment is also applicable to a cellular communications system, which is shown in FIG. 5, where users at the cell edge make up an interference system. The control vector of each edge user is calculated according to the above solution and control vectors that are available for users at the cell center are calculated according to the control vectors of edge users. Because users in a cell do not interference with other cells and the control vectors of the edge users and central users in one cell are orthogonal, the system capacity is also increased.

In particular, the base stations of cell 1 and cell 2 have multiple transmitting antennas; their edge users are specified as the first edge user and the second edge user; and their central users are specified as the first central user and the second central user. The first edge user and the second edge user make up a two-user interference system. To avoid interference, the first edge user and second edge user calculate control vectors independently according to the above technical solution and then choose a control vector for the central user of the local cell according to the control vectors of the first edge user and the second edge user. The specific steps are as follows:

1. Cell 1 and cell 2 obtain respective related matrixes $H_{mm\Sigma}{}^H H_{mm\Sigma}$ and $$\sum_{\substack{l=1\\l\neq m}}^{K} H_{ml\Sigma}^H H_{ml\Sigma}$$

of channels to the first edge user and the second edge user.

2. Cell 1 and cell 2 perform SVD on their respective $$\sum_{\substack{l=1 \\ l \neq m}}^{K} H_{ml\Sigma}^{H} H_{ml\Sigma}$$

to obtain U and Q in $$\sum_{\substack{l=1 \\ l \neq m}}^{K} H_{ml\Sigma}^{H} H_{ml\Sigma} = UQU^{H}.$$

In this embodiment, performing SVD on a matrix obtains three matrixes: a first matrix U, a second matrix Q, and a third matrix $U^H$, where the third matrix is the conjugate transpose of the first matrix.

3. Cell 1 and cell 2 obtain the eigenvector $v_0$ corresponding to the maximum eigenvalue $\lambda_0$ of their respective $[H_{mm\Sigma}(\sqrt{Q}U^{-1})]^H H_{mm\Sigma}(\sqrt{Q}U^{-1})$.

4. Cell 1 and cell 2 obtain the control vector $v_{m\Sigma}$ that maximizes the SLR: $v_{m\Sigma}=(\sqrt{Q}U^H)^{-1}v_0$. The control vector $v_{m\Sigma}$ from cell 1 to the first edge user is $v_1^e$ and the control vector $v_{m\Sigma}$ from cell 2 to the second edge user is $v_2^e$.

5. Cell 1 and cell 2 determine the control vector $v_1^c$ of the first central user and the control vector $v_2^c$ of the second central user respectively accordingly to $v_1^e$ and $v_2^e$, where $v_1^c$ and $v_1^e$ are orthogonal and $v_2^e$ and $v_2^c$ are orthogonal. This means choosing $v_1^c$ in the null space of $v_1^e$ and choosing $v_2^c$ in the null space of $v_2^e$.

6. The transmitter modulates data to be transmitted by means of one-dimensional modulation to obtain modulated symbols.

7. The transmitter processes the modulated symbols and the control vector to obtain the transmitted signal of every antenna and sends the transmitted data to the receiver.

In this embodiment, the processing of the modulated symbols and the control vector may include: multiplying the modulated symbols by the control vector. It is understandable that, in practice, operations other than multiplication may be adopted. The specific operation is not limited here.

8. The receiver detects the real part of the receive signal directly, namely receives the transmitted data in a predetermined spatial direction of received symbol.

In this embodiment, the control vector that maximizes the SLR is chosen and the data to be transmitted is processed according to the control vector. The SLR is the ratio of signal power from a transmitter to a receiver to interference power from the transmitter to other receivers. By maximizing the SLR, channel capacity is also increased. From the concept of SLR, it is known that in this embodiment, to realize the increase of channel capacity, the transmitter only needs to obtain channel information fed back by the receivers. The amount of data that the transmitter need obtain is smaller and the efficiency of data transmission is therefore higher.

Figure 6:
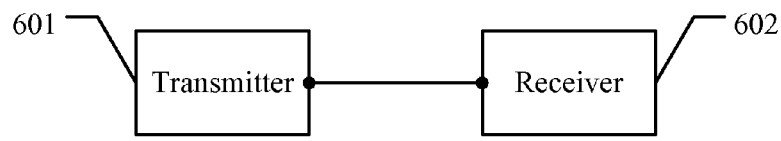
FIG. 6 shows a communications system in an embodiment of the present invention.

The following describes a communications system in an embodiment of the present invention. As shown in FIG. 6, the communications system includes a transmitter 601 and a receiver 602.

The transmitter 601 is adapted to: obtain channel information corresponding to channels between the transmitter and several receivers, obtain one or more control vectors of the receiver according to the channel information, modulate data to be transmitted by means of one-dimensional modulation to obtain modulated symbols, process the modulated symbols and the one or more control vectors to obtain transmitted data of each antenna, and send the transmitted data to the receivers 602.

In this embodiment, the processing of the modulated symbols and the control vector may include: multiplying the modulated symbols by the control vector. It is understandable that, in practice, operations other than multiplication may be adopted. The specific operation is not limited here.

The receiver 602 is adapted to receive the transmitted data in a predetermined spatial direction of received symbol.

For easy understanding, a centralized solution and a distributed solution of the communications system in the embodiment will be described.

In the distributed solution, the communications system includes a transmitter and a receiver.

The transmitter is adapted to: obtain data channel information from the transmitter to the first receiver and interference channels information corresponding to the channels between the transmitter and other receivers, where the first receiver is corresponding to the transmitter; obtain a control vector that maximizes the SLR according to the data channel information and interference channel information, where the SLR is the ratio of signal power from the transmitter to the first receiver to interference power from the transmitter to the other receivers; modulate data to be transmitted by means of one-dimensional modulation to obtain modulated symbols; process the modulated symbols and the control vector to obtain transmitted data of each antenna; and send the transmitted data to the receivers.

In this embodiment, the processing of the modulated symbols and the control vector may include: multiplying the modulated symbols by the control vector. It is understandable that, in practice, operations other than multiplication may be adopted. The specific operation is not limited here.

The receiver is adapted to: obtain the data channel information and the interference channel information and send the data channel information and the interference channel information to the transmitter and receive the transmitted data in a predetermined spatial direction of received symbol.

A specific scenario is provided for description of the communications system in this embodiment.

The transmitter obtains channel information corresponding to channels between the transmitter and several receivers, namely data channel information $H_{mm\Sigma}^{H} H_{mm\Sigma}$ and interference channel information $H_{mm\Sigma}^{H} H_{mm\Sigma}$.

The transmitter performs SVD on $$\sum_{\substack{l=1 \\ l \neq m}}^{K} H_{ml\Sigma}^{H} H_{ml\Sigma}$$

to obtain U and S in $$\sum_{\substack{l=1 \\ l \neq m}}^{K} H_{ml\Sigma}^{H} H_{ml\Sigma} = UQU^{H}.$$

In this embodiment, performing SVD on a matrix obtains three matrixes: a first matrix U, a second matrix Q, and a third matrix $U^H$, where the third matrix is the conjugate transpose of the first matrix.

The transmitter uses U and Q to obtain the eigenvector $v_0$ corresponding to the maximum eigenvalue $\lambda_0$ of $[H_{mm\Sigma}(\sqrt{Q}U^{-1})]^H H_{mm\Sigma}(\sqrt{Q}U^{-1})$; the transmitter obtains the control vector $v_{m\Sigma}$ that maximizes the SLR, $v_{m\Sigma}=(\sqrt{Q}U^H)^{-1}v_0$; the transmitter modulates data to be transmitted by means of one-dimensional modulation to obtain modulated symbols, processes the modulated symbols and the control vector to obtain the transmitted signal of each antenna, and sends the transmitted data to the receiver.

In this embodiment, the processing of the modulated symbols and the control vector may include: multiplying the modulated symbols by the control vector. It is understandable that, in practice, operations other than multiplication may be adopted. The specific operation is not limited here.

The receiver detects the real part of the received signal directly, namely receives the transmitted data in a predetermined spatial direction of received symbol.

In the centralized solution, the communications system includes a transmitter and a receiver.

The transmitter is adapted to: receive channel information corresponding to channels between the transmitter and several receivers; obtain a control vector matrix according to the channel information, where each column of the control vector matrix is corresponding to the control vector of one receiver; search for a corresponding control vector in the control vector matrix according to receiver information; modulate data to be transmitted by means of one-dimensional modulation to obtain modulated symbols; process the modulated symbols and the control vectors to obtain transmitted data of each antenna; and send the transmitted data to the receivers.

In this embodiment, the processing of the modulated symbols and the control vector may include: multiplying the modulated symbols by the control vector. It is understandable that, in practice, operations other than multiplication may be adopted. The specific operation is not limited here.

The receiver is adapted to receive the received signal in a predetermined spatial direction of received symbol.

In the communications system in this embodiment, the transmitter aligns the useful signal with the real part of the receiver. The receiver receives the transmitted data in a predetermined spatial direction of received symbol and afterwards, discards the imaginary part directly. Thus, the interference carried in the imaginary part is eliminated.

Figure 7:
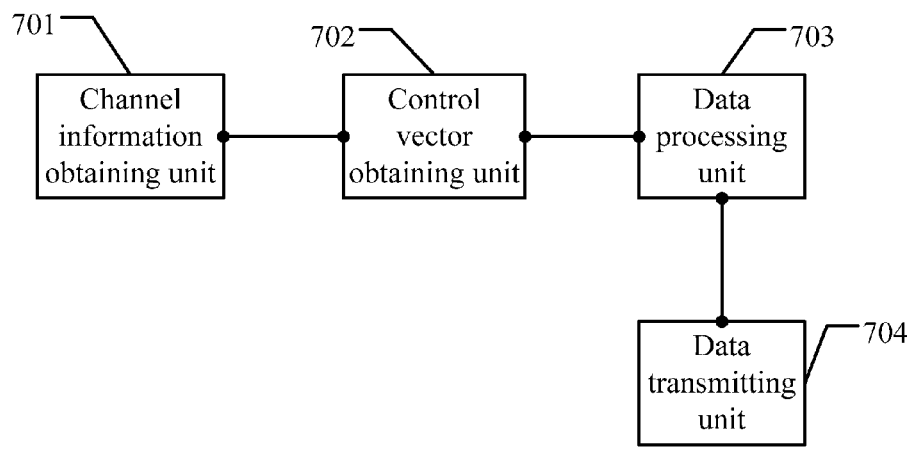
FIG. 7 shows a data transmitting apparatus in an embodiment of the present invention.

FIG. 7 shows a data transmitting apparatus in an embodiment of the present invention, including: a channel information obtaining unit 701, a control vector obtaining unit 702, a data processing unit 703, and a data transmitting unit 704.

The channel information obtaining unit 701 is adapted to obtain channel information corresponding to channels between the transmitter and several receivers.

The control vector obtaining unit 702 is adapted to obtain one or more control vectors corresponding to one or more receivers according to the channel information.

The data processing unit 703 is adapted to: modulate data to be transmitted by means of one-dimensional modulation to obtain modulated symbols and process the modulated symbols and the one or more control vectors to obtain the transmitted signal of each antenna.

In this embodiment, the processing of the modulated symbols and the control vector may include: multiplying the modulated symbols by the control vectors. It is understandable that, in practice, operations other than multiplication may be adopted. The specific operation is not limited here.

The data transmitting unit 704 is adapted to transmit the data to the one or more receivers.

For easy understanding, a distributed scenario is described below to explain the data transmitting apparatus. The data transmitting apparatus in the distributed solution includes: (1) a channel information obtaining unit, adapted to obtain information of a data channel between the transmitter and a first receiver and information of interference channels between the transmitter and other receivers, where the first receiver is corresponding to the transmitter; (2) a control vector obtaining unit, adapted to obtain a control vector that maximizes the SLR according to the data channel information and interference channel information obtained by the channel information obtaining unit, where the SLR is the ratio of signal power from the transmitter to the first receiver to interference power from the transmitter to the other receivers; and (3) a data processing unit, adapted to: modulate data to be transmitted by means of one-dimensional modulation to obtain modulated symbols and process the modulated symbols and the control vector obtained by the control vector obtaining unit to obtain transmitted data of each antenna.

In this embodiment, the processing of the modulated symbols and the control vector may include: multiplying the modulated symbols by the control vector. It is understandable that, in practice, operations other than multiplication may be adopted. The specific operation is not limited here.

The data transmitting apparatus in the distributed solution further includes a data transmitting unit, which is adapted to transmit the transmitted data obtained by the data processing unit to the receiver.

It should be noted that the channel information obtaining unit in this embodiment may obtain channel information as follows: (1) receiving data channel information fed back by the first receiver and interference channel information fed back by other receivers; or (2) detecting information of a data channel between the transmitter and the first receiver and information of interference channels between the transmitter and the other receivers.

In this embodiment, the control vector obtaining unit chooses the control vector that maximizes the SLR and the data processing unit processes the data to be transmitted according to the control vector. The SLR is the ratio of signal power from a transmitter to a receiver to interference power from the transmitter to other receivers. By maximizing the SLR, channel capacity is also increased. From the concept of SLR, it is known that in this embodiment, to realize the increase of channel capacity, the transmitter only needs to obtain channel information fed back by the receivers. The amount of data that the transmitter need obtain is smaller and the efficiency of data transmission is therefore higher.

Figure 8:
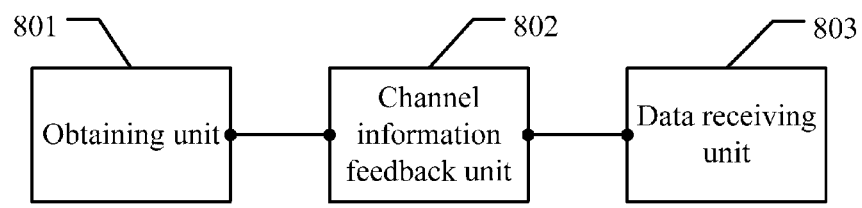
FIG. 8 shows a data receiving apparatus in an embodiment of the present invention.

FIG. 8 shows a data receiving apparatus in an embodiment of the present invention, including: (1) an obtaining unit 801, adapted to obtain information of a channel between a transmitter and the data receiving apparatus; (2) a channel information feedback unit 802, adapted to feed back the channel information to the transmitter; and (3) a data receiving unit 803, adapted to receive transmitted data from the transmitter in a predetermined spatial direction of received symbol.

In this embodiment, the transmitter aligns the useful signal with the real part of the receiver; and the data receiving unit 803 receives the transmitted data in a predetermined spatial direction of received symbol and afterwards, discards the imaginary part directly. Thus, the interference carried in the imaginary part is eliminated.

Figure 9:
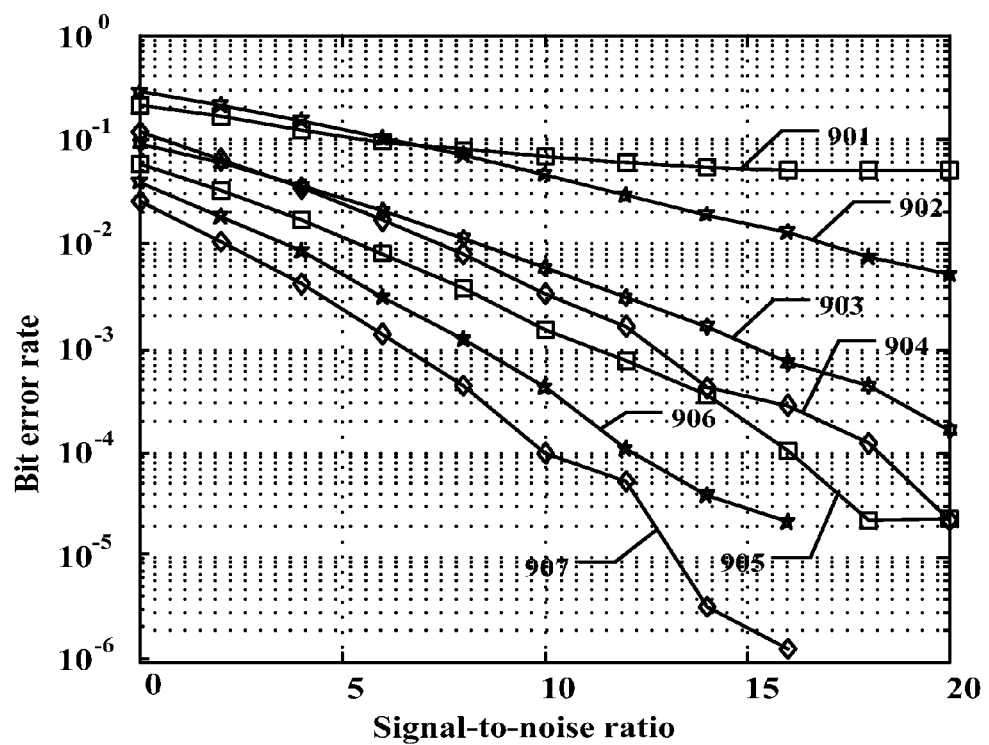
FIG. 9 shows performance curves in an embodiment of the present invention.
Figure 10:
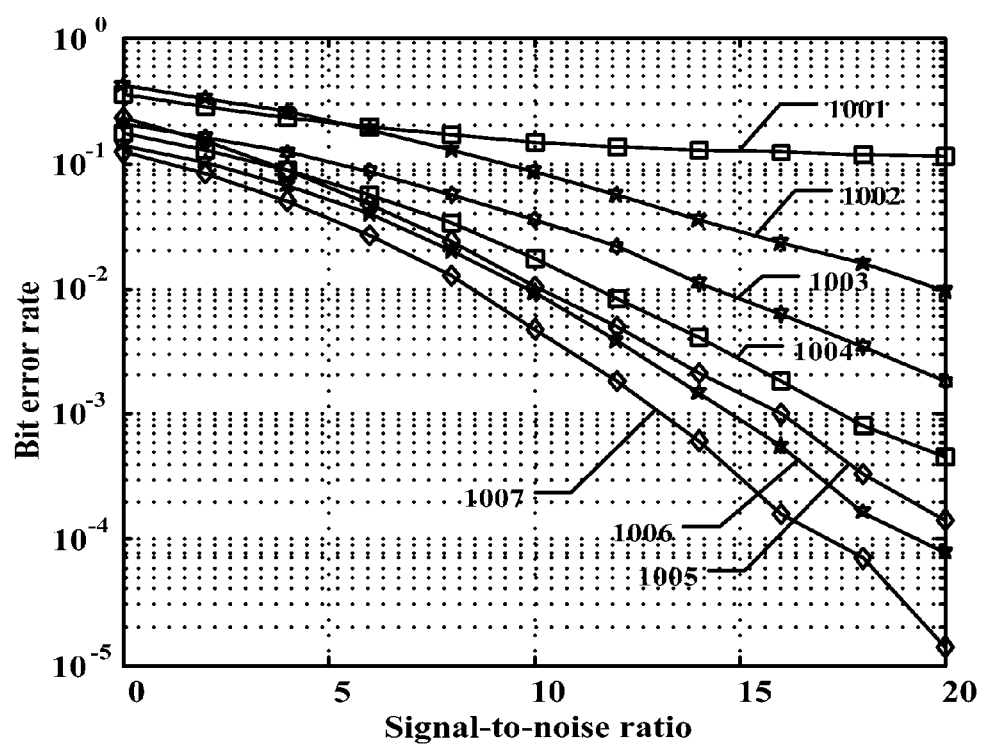
FIG. 10 shows other performance curves in an embodiment of the present invention.

The benefits of the above technical solution are illustrated in FIG. 9 and FIG. 10.

FIG. 9 compares the performance of the distributed data transmission solution in an embodiment of the present invention with that of a data transmission solution in a conventional art. The number of transmitting antennas is 4. Binary Phase Shift Keying (BPSK) modulation is adopted in the conventional art and 2 Pulse Amplitude Modulation (2PAM) is adopted in this embodiment.

Curve 901 is a 5-user performance curve in the conventional art; curve 902 is a 4-user performance curve in the conventional art; and curve 904 is a 3-user performance curve in the conventional art.

Curve 903 is a 6-user performance curve in this embodiment; curve 905 is a 5-user performance curve in this embodiment; curve 906 is a 4-user performance curve in this embodiment; and curve 907 is a 3-user performance curve in this embodiment.

The figure shows that, with the same number of users, the bit error rate in this embodiment is lower than the bit error rate in the conventional art, which means with the same bit error rate, the solution in this embodiment may support more users.

FIG. 10 compares the performance of the centralized data transmission solution in an embodiment of the present invention with that of a data transmission solution in the conventional art. The number of transmitting antennas is 4. Quadrature Phase Shift Keying (QPSK) modulation is adopted in the conventional art and 4PAM modulation is adopted in this embodiment.

Curve 1001 is a 5-user performance curve in the conventional art; curve 1002 is a 4-user performance curve in the conventional art; and curve 1005 is a 3-user performance curve in the conventional art.

Curve 1003 is a 6-user performance curve in this embodiment; curve 1004 is a 5-user performance curve in this embodiment; curve 1006 is a 4-user performance curve in this embodiment; and curve 1007 is a 3-user performance curve in this embodiment.

The figure shows that, with the same number of users, the bit error rate in this embodiment is lower than the bit error rate in the conventional art, which means with the same bit error rate, the solution in this embodiment may support more users.

It is understandable to those skilled in the art that or part of the steps of the foregoing embodiments may be implemented by hardware instructed by a program. The program may be stored in a computer-readable storage medium. When being executed, the program performs the following steps:

A transmitter obtains channel information corresponding to channels between the transmitter and several receivers.

The transmitter obtains one or more control vectors corresponding to one or more receivers according to the channel information.

The transmitter modulates data to be transmitted by means of one-dimensional modulation to obtain modulated symbols.

The transmitter processes the modulated symbols and the one or more control vectors to obtain transmitted data of each antenna.

The transmitter transmits the data to the one or more receivers.

The receiver receives the transmitted data in a predetermined spatial direction of received symbol.

The storage medium may be a read-only memory, a magnetic disk or a compact disk.

Detailed above are a method and apparatus for realizing the full coverage of common channels. Although the present invention has been described through some exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. A method for data transmission, comprising:
   obtaining, by a transmitter, channel information $H_{sup}$ corresponding to channels between the transmitter and several receivers;
   obtaining, by the transmitter, one or more control vectors corresponding to one or more receivers according to the channel information;
   modulating, by the transmitter, data to be transmitted by one-dimensional modulation to obtain modulated symbols;
   processing, by the transmitter, the modulated symbols and the control vectors to obtain transmitted data of each antenna; and
   transmitting, by the transmitter, the transmitted data to the one or more receivers so that the one or more receivers receive the transmitted data in a predetermined spatial direction of received symbols,
   wherein $$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix}$$

and $H_{l\Sigma}=[Re(H_l) Im(H_l)]$ or $H_{l\Sigma}=[Im(H_l) -Re(H_l)]$, $H_l$ is the state information of the channel between the transmitter and the $l^{th}$ receiver.

2. The method of claim 1, wherein obtaining one or more control vectors corresponding to one or more receivers according to the channel information by the transmitter further comprising:
   obtaining, by the transmitter, a control vector matrix according to the channel information, wherein each column of the control vector matrix is corresponding to the control vector of one receiver; and
   searching, by the transmitter, for a corresponding control vector in the control vector matrix according to receiver information.

3. The method of claim 2, wherein the control vector matrix $V_\Sigma$ is calculated according to a formula $$V_\Sigma = H_{sup}^H (H_{sup} H_{sup}^H)^{-1};$$

wherein the $H_{sup}$ is extended channel information matrix corresponding to the channels between the transmitter and the receivers and the $H_{sup}^H$ is the conjugate transpose of the $H_{sup}$.

4. The method of claim 2, wherein the control vector matrix $V_\Sigma$ is calculated according to a formula $$V_\Sigma = H_{sup}^H (H_{sup} H_{sup}^H \sigma_n^2 I_n)^{-1};$$

wherein the $H_{sup}$ is extended channel information matrix corresponding to the channels between the transmitter and the receivers, the $H_{sup}^H$ is the conjugate transpose of the $H_{sup}$, $I_n$ is a unit matrix and the $\sigma_n^2$ is a variance of noises.

5. The method of claim 1, wherein obtaining channel information corresponding to channels between the transmitter and several receivers by a transmitter further comprising:

obtaining, by the transmitter, information of a data channel between the transmitter and a first receiver and information of the interference channels between the transmitter and other receivers;

wherein the first receiver is corresponding to the transmitter.

6. The method of claim 5, wherein obtaining one or more control vectors corresponding to the one or more receivers according to the channel information by the transmitter further comprising:

obtaining, by the transmitter, one or more control vectors that maximizes the Signal-to-Leakage Ratio (SLR) according to the data channel information and interference channel information, where the SLR is the ratio of signal power from the transmitter to the first receiver to interference power from the transmitter to the other receivers.

7. The method of claim 6, wherein obtaining one or more control vectors that maximizes the SLR according to the data channel information and interference channel information by the transmitter further comprising:

performing, by the transmitter, Singular Value Decomposition (SVD) on a matrix to obtain a first matrix U, a second matrix Q, and a third matrix $U^H$, wherein the third matrix $U^H$ is the conjugate transpose of the first matrix U;

obtaining, by the transmitter, an eigenvector $v_0$ corresponding to a maximum eigenvalue $v_0$ of $[H_{m\Sigma}(\sqrt{Q}U^H)^{-1}]^H H_{m\Sigma}(\sqrt{Q}U^H)^{-1}$ according to the U and the Q, wherein the $[H_{mm\Sigma}(\sqrt{Q}U^{-1})]^H$ is a conjugate transpose of the $[H_{mm\Sigma}(\sqrt{Q}U^{-1})]$, $H_{mm\Sigma}$ is a matrix made up of the real part of a matrix $H_{mm}$ and the imaginary part of the matrix $H_{mm}$, and the $H_{mm}$ is a channel coefficient matrix between the $m^{th}$ transmitter and the $m^{th}$ receiver; and obtaining, by the transmitter, a control vector $v_{m\Sigma}$ according to a formula $v_{m\Sigma}=(\sqrt{Q}U^H)^-v_0$.

8. The method of claim 5, wherein obtaining information of a data channel between the transmitter and a first receiver and information of the interference channels between the transmitter and other receivers by the transmitter further comprising:

obtaining, by the receivers, channel information corresponding to the channels between the transmitter and the receivers via pilot channel or blind estimation; and sending, by the receivers, the obtained channel information to the transmitter.

9. The method of claim 5, wherein obtaining information of a data channel between the transmitter and a first receiver and information of the interference channels between the transmitter and other receivers by the transmitter further comprising:

detecting, by the transmitter, information of a data channel between the transmitter and the first receiver and information of the interference channels between the transmitter and the other receivers, if current upward and downward channels are symmetric.

10. The method of claim 7, wherein obtaining an eigenvector $v_0$ corresponding to the maximum eigenvalue $\lambda_0$ of $[H_{m\Sigma}(\sqrt{Q}U^H)^{-1}]^H H_{m\Sigma}(\sqrt{Q}U^H)^{-1}$ according to the U and the Q by the transmitter further comprising:

choosing, by the transmitter, a eigenvalue of the maximum numerical value as the maximum eigenvalue; and obtaining, by the transmitter, the eigenvector that is corresponding to the maximum eigenvalue as the $v_0$.

11. A communication system, comprising:

a transmitter adapted to (1) obtain channel information $H_{sup}$ corresponding to channels between the transmitter and several receivers, (2) obtain one or more control vectors corresponding to one or more receivers of the several receivers according to the channel information, (3) modulate data to be transmitted by one-dimensional modulation to obtain modulated symbols, (4) process the modulated symbols and the one or more control vectors to obtain transmitted data, and (5) send the transmitted data to the one or more receivers; and the one or more receivers adapted to receive the transmitted data in a predetermined spatial direction, wherein $$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix}$$

and $H_{l\Sigma}=[\text{Re}(H_l)\text{Im}(H_l)]$ or $H_{l\Sigma}=[\text{Im}(H_l)-\text{Re}(H_l)]$, $H_l$ is the state information of the channel between the transmitter and the $l^{th}$ receiver.

12. The system of claim 11, wherein the channel information includes information about a data channel between the transmitter and a first receiver and information about interference channels between the transmitter and other receivers and at least one of the control vectors maximizes the Signal-to-Leakage Ratio (SLR) according to the data channel and interference channel information, where the SLR is the ratio of the signal power from the transmitter to the first receiver and interference power from the transmitter to the other receivers.

13. The system of claim 11, wherein the transmitter is further adapted to (1) obtain a control vector matrix according to the channel information, wherein each column of the control vector matrix corresponds to the control vector of one receiver; (2) search for a corresponding control vector in the control vector matrix according to receiver information for use in the transmitted data.

14. An apparatus for data transmission, comprising:

a channel information obtaining unit, adapted to obtain channel information $H_{sup}$ corresponding to channels between the transmitter and several receivers;

a control vector obtaining unit, adapted to obtain one or more control vectors corresponding to one or more receivers according to the channel information;

a data processing unit, adapted to modulate data to be transmitted by one-dimensional modulation to obtain modulated symbols and use the modulated symbols and the control vectors to obtain transmitted data; and a data transmitting unit, adapted to transmit the transmitted data to the one or more receivers so that the one or more receivers receive the transmitted data in a predetermined spatial direction of received symbols, wherein $$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix}$$

and $H_{l\Sigma}=[\text{Re}(H_l)\text{Im}(H_l)]$ or $H_l=[\text{Im}(H_l)-\text{Re}(H_l)]$, $H_l$ is the state information of the channel between the transmitter and the $l^{th}$ receiver.

15. The apparatus of claim 14, wherein the channel information obtaining unit is further adapted to obtain information of a data channel between the transmitter and a first receiver and information of interference channels between the transmitter and other receivers; and wherein the control vector obtaining unit is further adapted to obtain at least one of the control vectors that maximizes the Signal-to-Leakage Ratio (SLR) according to the data channel information and interference channel information obtained by the channel information obtaining unit, where the SLR is the ratio of signal power from the transmitter to the first receiver to interference power from the transmitter to the other receivers.

16. The apparatus of claim 15, wherein the control vector obtaining unit is further adapted to (1) obtain a control vector matrix according to the channel information, (2) search for a corresponding control vector in the control vector matrix according to receiver information, wherein each column of the control vector matrix corresponds to the control vector of one receiver.

17. An apparatus for data transmission, comprising:
an obtaining unit, adapted to obtain channel information $H_{sup}$ corresponding to each of channels between a transmitter and data receiving apparatus;
a channel information feedback unit, adapted to feed back the channel information to the transmitter; and
a data receiving unit, adapted to receive transmitted data from the transmitter in a predetermined spatial direction of received symbols, wherein said transmitter comprises:
a channel information obtaining unit, adapted to obtain the channel information;
a control vector obtaining unit, adapted to obtain one or more control vectors corresponding to one or more receivers according to the channel information;
a data processing unit, adapted to modulate data to be transmitted by one-dimensional modulation to obtain modulated symbols and use the modulated symbols and the control vectors to obtain the transmitted data; and
a data transmitting unit, adapted to transmit the transmitted data to the one or more receivers so that the one or more receivers receive the transmitted data in the predetermined spatial direction of the received symbols,
wherein $$H_{sup} = \begin{bmatrix} H_{1\Sigma} \\ \vdots \\ H_{m-1\Sigma} \\ H_{m+1\Sigma} \\ \vdots \\ H_{K\Sigma} \end{bmatrix}$$

and $H_{l\Sigma}=[\text{Re}(H_l)\text{Im}(H_l)]$ or $H_{l\Sigma}=[\text{Im}(H_l)-\text{Re}(H_l)]$, $H_l$ is the state information of the channel between the transmitter and the $l^{th}$ receiver.

* * * * *

UNITED STATES PATENT AND TRADEMARK OFFICE
CERTIFICATE OF CORRECTION

PATENT NO. : 8,503,564 B2
APPLICATION NO. : 12/692202
DATED : August 6, 2013
INVENTOR(S) : Li et al.

It is certified that error appears in the above-identified patent and that said Letters Patent is hereby corrected as shown below:

In the Claims:

Claim 4, Column 18, Line 59 " $V_\Sigma = H_{sup}^{H}(H_{sup}H_{sup}^{H}\sigma_n^2 I_n)^{-1};$ "

should read -- $V_\Sigma = H_{sup}^{H}(H_{sup}H_{sup}^{H} + \sigma_n^2 I_n)^{-1};$ --.

Claim 7, Column 19, Line 27 "maximum eigenvalue $v_0$" should read -- maximum eigenvalue $\lambda_0$ --.

Claim 7, Column 19, Line 35 "formula $v_{m\Sigma}=(\sqrt{Q}U^H)^{-}v_{0\cdot}$ " should read -- formula $v_{m\Sigma} = (\sqrt{Q}U^H)^{-1}v_0 \cdot$ --.

Signed and Sealed this
Twenty-sixth Day of November, 2013

Margaret A. Focarino
*Commissioner for Patents of the United States Patent and Trademark Office*